(12) United States Patent
Calderon et al.

(10) Patent No.: US 6,214,085 B1
(45) Date of Patent: Apr. 10, 2001

(54) METHOD FOR DIRECT STEELMAKING

(75) Inventors: Albert Calderon; Terry James Laubis, both of Bowling Green, OH (US)

(73) Assignee: Calderon Energy Company of Bowling Green, Inc., Bowling Green, OH (US)

( * ) Notice: Subject to any disclaimer, the term of this patent is extended or adjusted under 35 U.S.C. 154(b) by 0 days.

(21) Appl. No.: 09/241,649

(22) Filed: Feb. 1, 1999

(51) Int. Cl.$^7$ ................................................. C21B 13/14
(52) U.S. Cl. ................... 75/486; 75/500; 75/501; 75/502; 75/503; 75/553
(58) Field of Search ................... 75/486, 487, 500, 75/503, 553, 501, 502, 10.15

(56) References Cited

U.S. PATENT DOCUMENTS 3,941,359 * 3/1976 Shinville et al. ............... 75/486
4,756,748 * 7/1988 Lu et al. ............... 75/10.19
5,445,363   8/1995 Becerra-Novoa et al. .

* cited by examiner

*Primary Examiner*—Melvyn Andrews
(74) *Attorney, Agent, or Firm*—Marshall & Melhorn

(57) ABSTRACT

This invention relates to making steel directly from ore concentrate and non-coking coal to which flux material is added. The method eliminates numerous steps by reducing the ore with the coal in a sealed chamber and under pressure termed "carbotreating" to make a fluxed iron/carbon product which after crushing, is injected while hot into a melting furnace. The hot product is melted with oxygen under reducing conditions using excess carbon from the coal to make a carburized molten iron and a slag low in FeO termed "oxymelting". After the tapping of the slag, the carburized molten iron to which flux material is added, is blown with oxygen to make steel, CO, and a slag high in FeO termed "decarburizing". The steel is tapped while the slag is retained in the furnace. All of the above steps are carried out in an efficient and environmentally sound manner which render the art of steelmaking significantly more economical than conventionally practiced.

29 Claims, 2 Drawing Sheets

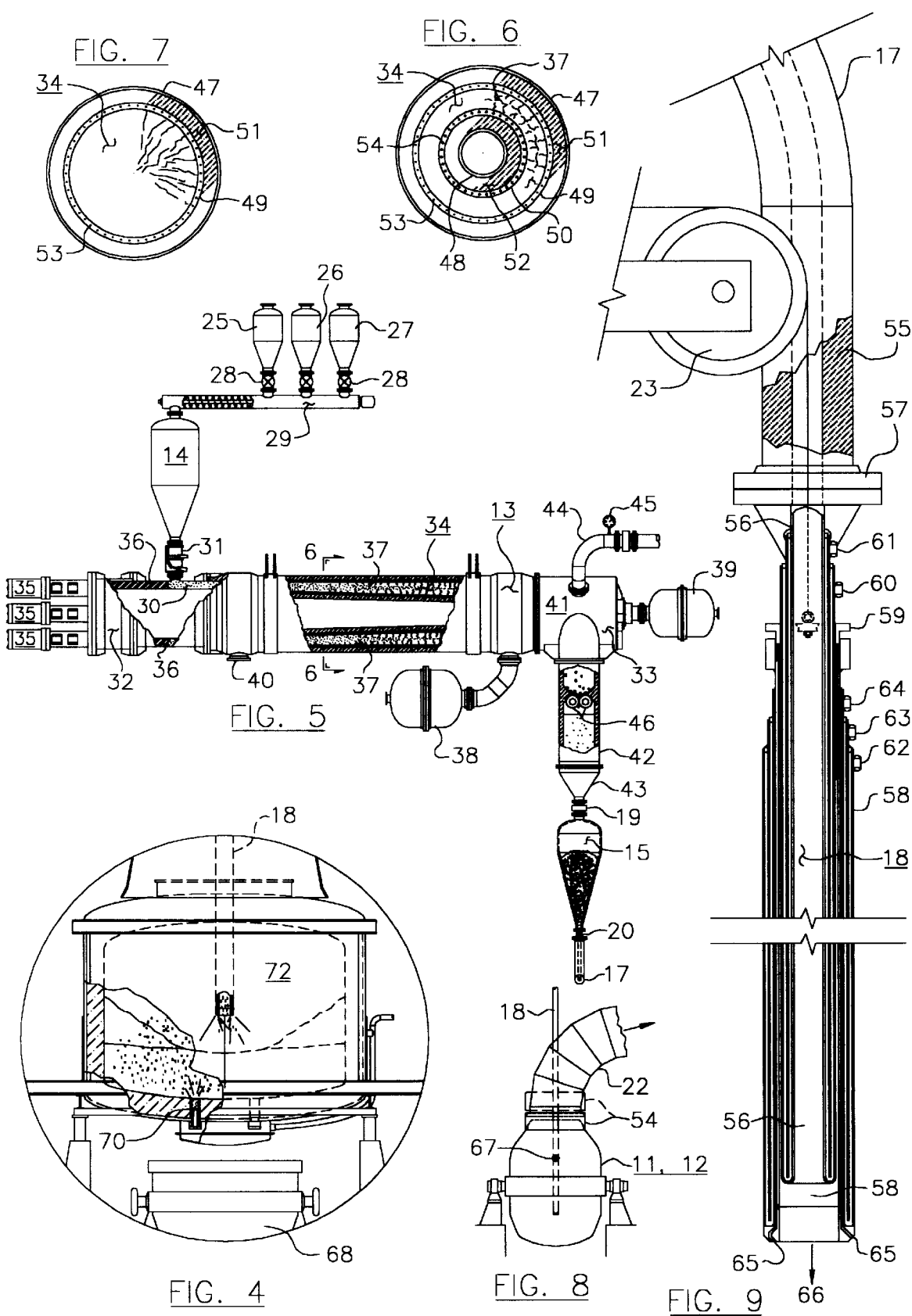

METHOD FOR DIRECT STEELMAKING

Introduction

This invention relates to a method for making steel directly. Conventionally, about 60% of the steel is made in integrated facilities generally consisting of a coke plant, a sintering plant, a blast furnace (BF) department and a basic oxygen furnace (BOF) complex. The other 40% is mainly produced in facilities known as electric arc furnace (EAF) shops or mini-mills which use scrap melters energized with electric power; in some instances iron units in other forms complement the scrap charged. Whether steel is made in integrated facilities or in scrap melters both processes suffer from production inefficiency, poor energy performance, environmental problems and large capital investment needs.

With respect to production inefficiency, it begins at the mine where the ore concentrate is made into pellets which are fired, and the special metallurgical coals that are mined and then classified at the delivery point where they are crushed to make a three or four component blend in order to produce a coke suitable for the BF; or, the concentrate is delivered to the sinter plant to make a sinter that is charged together with pellets and coke in the BF. The BF makes molten iron which is tapped into refractory lined torpedo cars and delivered to the BOF complex by rail using a locomotive. The molten iron is poured into a ladle which is then charged into the BOF. Every one of the above mentioned steps adds to production inefficiency which increases the discharge of greenhouse gases.

With respect to poor energy performance it takes energy to agglomerate the concentrate to form green pellets which are then fired to make pellets suitable for use at the BF. In the classifying of the various coals and their crushing to make the proper blend, in the making of the coke inclusive of the significant heat losses which take place during the heating of the coal, and in the using of the extensive machinery which is required for charging of the coal, pushing and quenching of the incandescent coke, conveying it and screening it, large quantities of energy are expended. The BF also consumes appreciable quantities of energy inclusive of the turbo-blowers to compress the air for the blast. In making the sinter as a feed for the BF, the sinter plant expends energy in firing hot gases through the raw materials to make the sinter, and then cooling it before delivery to the BF. Moving massive torpedo cars by locomotive from the BF department to the steelmaking complex demands expenditure of energy in addition to heat losses incurred until the molten iron is in the BOF ready to be blown. Pollution control devices of all sorts which consume large quantities of energy are disposed at the mines, at the coke plant, at the sinter plant at the BF and at the BOF. In the making of steel with scrap which is melted with electric power, the energy consumption is quite high by virtue of the high demand which is in surge form; also, electricity must be generated at the power plant and the efficiency of generating electricity is only about 33%. When melting iron units from directly reduced iron or the like, the consumption of electric power increases by roughly 50%. Poor energy performance means greater energy consumption which results in the discharge of excessive greenhouse gases.

With respect to environmental problems, every step taken in connection with conventional steelmaking whether it occurs at the mine, in the coke plant, in the sinter plant, at the BF or in handling and charging of molten iron into the steelmaking furnace, emissions of all sorts take place; emissions in the form of hydrocarbons, CO, $H_2S$, $SO_2$, $NO_x$, $CH_4$, and particulate matter and of course very large quantities of $CO_2$.

With respect to investments, the last integrated steelmaking facility in the U.S. was built by Bethlehem Steel at Burns Harbor, Indiana about 40 years ago. The reason no other integrated facility was constructed is because the investment cannot be afforded; however several mini-mills (EAF's) have been constructed but mini-mills are essentially recyclers of steel scrap. But even in mini-mills, the cost of facilities is steadily increasing by virtue of the need to make quality steel with no contaminants. This situation is forcing scrap melters to build additional costly facilities (or have others build facilities) for producing from (virgin ore sources) iron units such as directly reduced iron (DRI), hot briquetted iron (HBI), iron carbide ($Fe_3C$) or molten iron in order to be able to market an acceptable product which is devoid of contaminants.

OBJECTIVE OF THE INVENTION

The present invention addresses the above disadvantages by eliminating pelletizing the ore, the coke plant, the sintering plant and the blast furnace in integrated facilities and the electricity need for melting in mini-mills, and has for its main object the overcoming of such disadvantages with one single solution which is:

Efficient in production as well as in energy performance;

Environmentally benign; and

Low in capital requirement.

Another object of the present invention is to lower the operating costs of making a ton of steel by greatly reducing the manpower required.

Still another object of the instant invention is to increase the yield of steel from the same amount of raw material used.

Although this invention does not eliminate all green house gases originating from steelmaking, it substantially reduces their generation.

Other objects of this invention will appear from the following description and appended claims; reference is made to the accompanying drawings which describe certain physical structures to practice this method of making steel directly.

BRIEF DESCRIPTION OF DRAWINGS

FIG. 4 shows a furnace which is similar to an electric arc furnace (EAF) except that it is modified in order to obviate the necessity of using expensive and inefficient electric power for melting.

FIGS. 2, 2A, 3 and 4 have been included herein in order to further aid in the description of the method.

FIG. 5 shows one of the reactors with a cut-away, to process iron ore concentrate, coal and stone (dolomitic and/or quick lime) to produce a fluxed iron/carbon product for hot delivery to any one of the furnaces shown in FIGS. 1, 2, 3 and 4.

FIG. 6 is a section of the reactor taken at 6—6 of FIG. 5, and showing a configuration of the reactor which takes the form of an annulus to contain the mixture of iron ore and carbonaceous material and stone and to heat this mixture bi-directionally within the annulus to form a fluxed iron/carbon product.

FIG. 7 is a section of the reactor showing an alternate design wherein no annular configuration is used.

FIG. 8 shows a BOF such as the furnaces shown in FIG. 1, with a skirt at the mouth of the furnace, which is adapted to be raised or lowered in order to provide the capability to suppress the combustion of gases as they leave the mouth of the furnace during the blowing of oxygen.

FIG. 9 shows a detailed view of the special lance that feeds in combination, oxygen and the pneumatically blown iron/carbon product into any of the furnaces shown in FIGS. 1, 2, 3 and 4.

Before explaining in detail the present invention, it is to be understood that his invention is not limited to the details or the arrangement of the parts illustrated in the attached drawings; the invention can be made operative by using other embodiments. Also it is to be understood that the terminology herein contained is for the purpose of description and not limitation.

DETAILED DESCRIPTION OF DRAWINGS

Figure 1:
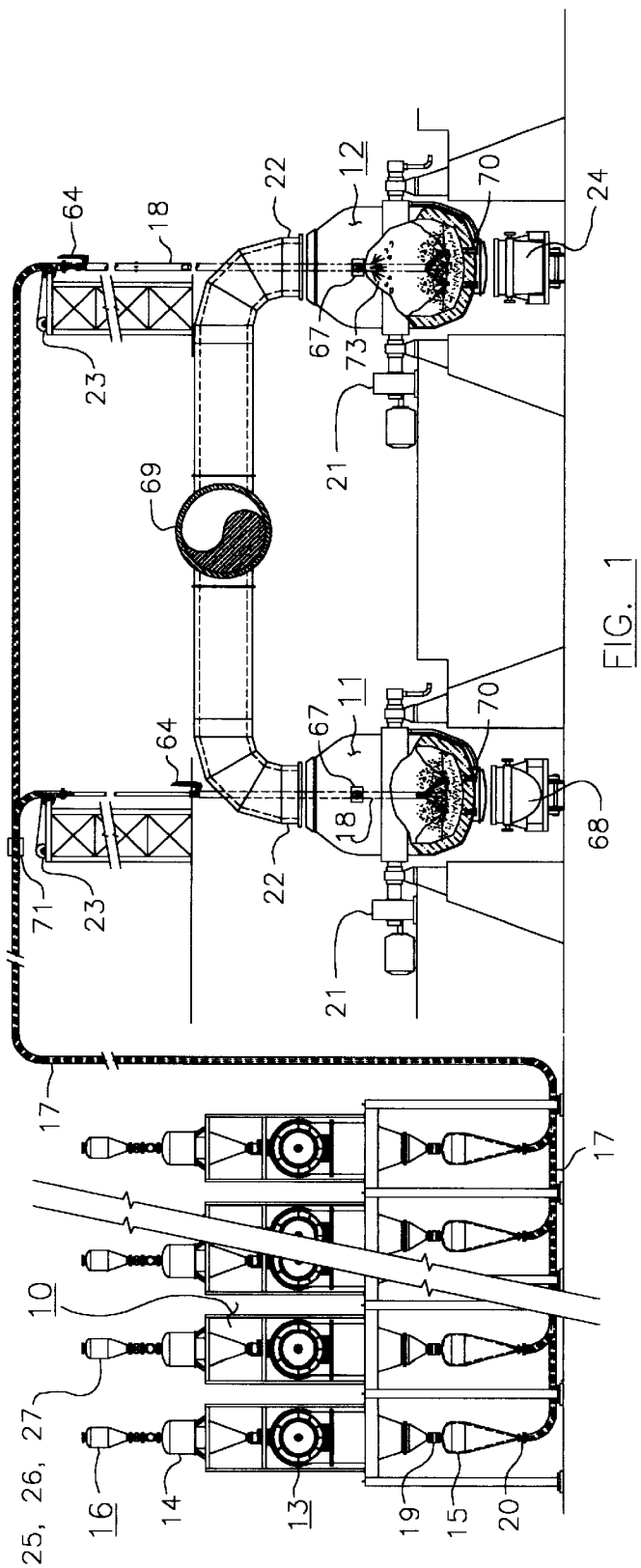
FIG. 1 is an elevational view of the apparatus to carry out the invention; it is configured in such a way as to form a battery of reactors and two melting furnaces, which are similar to basic oxygen furnaces (BOF's) which are in common use. Also shown, are lockhoppers adapted to be used as transporters to pneumatically convey hot, iron/carbon product made in the reactors, to the furnaces in order to produce steel directly in a single vessel (furnace).

Referring to FIG. 1, numeral 10 denotes a battery of reactors (partially shown) where the treating of the ore with a carbonaceous material but preferably with coal (hereinafter referred to as "carbotreating") takes place to make a hot, directly reduced iron/carbon product. Numeral 11 denotes a furnace where the melting of the iron/carbon product (hereinafter referred to as "oxymelting") takes place with oxygen, to produce a molten iron and slag. The slag is lip-poured out of furnace 11 and the molten iron is blown with pure oxygen to make steel (hereinafter A referred to as"decarburizing"). Numeral 12 denotes a furnace which is similar to furnace 11 and may be used the same as furnace 11 except it is sequenced in order to increase productivity and operated in such a way that when furnace 11 is oxymelting, furnace 12 is decarburizing, and when furnace 11 is decarburizing, furnace 12 is oxymelting.

Battery 10 consists of a plurality of reactors, such as reactor 13, with each reactor being equipped with hopper 14 above reactor 13, and transporter 15 being below reactor 13. Both hopper 14 and transporter 15 take the form of a lockhopper configuration but in some cases hopper 14 need not be a lockhopper; for purposes of description hopper 14 will be assumed to be a lockhopper. A materials feeding system 16 feeds materials into hopper 14 which in turn feeds such materials into reactor 13; these materials which comprise iron ore (such as iron ore concentrate), and other iron bearing materials (such as iron oxide, effluent dust, scale, etc.), a reductant (such as coal), and a flux (such as dolomitic and/or quick lime or limestone) are metered in order to form a mix; this mix may be prepared at ground level and then delivered to hopper 14. These materials may also be dried prior to delivery to hopper 14.

Several transporters like transporter 15 communicate with furnace 11 and furnace 12 via piping system 17 for the pneumatic conveyance of hot, fluxed iron/carbon product to either furnace 11 or furnace 12 by making use of directional valve 71, as will be described in detail hereinafter in the Operation Section of this description. Piping system 17 is equipped with injection lance 18 for the introduction of the hot, fluxed iron/carbon product into either furnace 11 or furnace 12; hoist 23 serves to raise or lower lance 18. Each reactor 13 is designed to operate at a pressure preferably of several atmospheres; process gas which is reducing in nature is generated while the mix is heated in reactor 13 to create the pressure; some of the process gas is used to pneumatically deliver the hot, fluxed iron/carbon product to either furnace 11 or furnace 12 by making use of valve 19 and valve 20 which are respectively positioned above and below transporter 15; valve 19 and valve 20 are provided with cooling means to withstand the flow of hot iron/carbon product through them. Furnace 11 and furnace 12 are each equipped with drive 21 to make possible the rotation of each furnace in order to service it. Both furnaces 11 and 12 are equipped with injection ports at the bottom and denoted by numeral 70 for the introduction of nitrogen or argon to assist in the stirring of the bath; in some instances oxygen may also be introduced from the bottom of the furnaces.

Lance 18 which serves to blow the oxidant (preferably oxygen) into furnace 11 or furnace 12 may be a multi-purpose lance in order to introduce into furnace 11 or furnace 12 both the oxygen and the iron/carbon product; the details of lance 18 will be described hereinafter. Hoods 22 are provided to collect the off-gas from furnaces 11 and 12. These hoods connect to a main header denoted by numeral 69 which leads to a gas cleanup system which is not shown in the Drawings in order to treat the gas. The molten steel and the molten slag from furnaces 11 and 12 are handled in a manner described in the Operations Section of this disclosure since the disclosure in FIGS. 2, 2A, 3 and 4 is an aid to further describe the operation of the invention, such disclosure will also follow in the Operation Section of this specification. Referring to FIG. 5 for a detailed description of reactor 13, surge hopper 25 is provided to contain the iron ore and surge hopper 26 to contain the coal; hopper 27 may be added to contain the flux (dolomite or limestone). Feeders such as feeder 28 installed at the bottom of each surge hopper, control the flow of the materials to be processed. A mixing device denoted by numeral 29, serves to blend the ore, coal and flux. Lockhopper 14 is disposed above reactor 13 to receive the blend from mixing device 29. The control of the feed of the mix into the charging end of reactor 13 is effected by feed control mechanism 31.

Reactor 13 is made up of charging end 32 and discharging end 33, and in between these two ends reaction chamber 34 which is elongated in configuration is preferably horizontally disposed. On charging end 32 the materials compressing mechanism is located; this mechanism is composed of hydraulic cylinders 35 that are connected to a ram (piston), which is denoted by numeral 36. Reaction chamber 34 may take a cross-sectional shape of an annulus denoted by numeral 37 as shown by FIG. 6 or of a full circle as shown by FIG. 7; these two configurations will be described in more detail hereinafter. Reaction chamber 34 is serviced by burners 38 and 39, with flue gas from burner 38 heating indirectly the outer wall of annulus 37 and flue gas from burner 39 heating indirectly the inner wall of annulus 37. The flue gas from burners 38 and 39 is directed countercurrent to the direction of the movement of the material being processed between charging end 32 and discharging end 33, with flue gas exiting reaction chamber 34 through port 40.

Discharging end 33 of reactor 13 is made up of elbow 41, downcomer 42, and transition 43. Exhaust 44 is provided in elbow 41 to direct process gas out of reactor 13 with pressure control 45 controlling the back pressure within reaction chamber 34; the process gas is directed to a gas treatment facility which is not shown. It is to be noted that the process gas produced within reaction chamber 34 is directed towards end 33 for discharge. Within downcomer 42, a set of crushing rolls denoted by numeral 46, is disposed in order to crush the fluxed iron/carbon product while hot, prior to its feed into lockhopper 15; the reduction in size by crushing makes the iron/carbon product suitable for pneumatic injection.

FIG. 6, a cross-section of reaction chamber 34, is made up of outer pressure shell 47 and inner pressure shell 48; in between these two shells annulus 37 is formed by outer heating flue 49 and inner heating flue 50. Insulation 51 is interposed between outer shell 47 and outer heating flue 49, and insulation 52 is interposed between inner shell 48 and inner heating flue 50. Hot gases from the combustion chamber of burner 38 (shown in FIG. 5) flow preferably axially through holes denoted by numeral 53 in outer heating flue 49 and hot gases from the combustion chamber of burner 39 (shown in FIG. 5) flow preferably axially through holes denoted by numeral 54 in inner heating flue 50 in order to provide indirect and bidirectional heating to the material processed within annulus 37 by conduction. These hot gases are directed counter-current to the direction of the material being moved through reaction chamber 34 by means of ram 36 using compression at charging end 32. Outer flue 49 and inner flue 50 are made of a highly conductive material which is operable at high temperature and be resistant to both abrasion and chemical attack. Preferably annulus 37 is made to taper divergently towards discharging end 33 (shown in FIG. 5).

Figure 3:
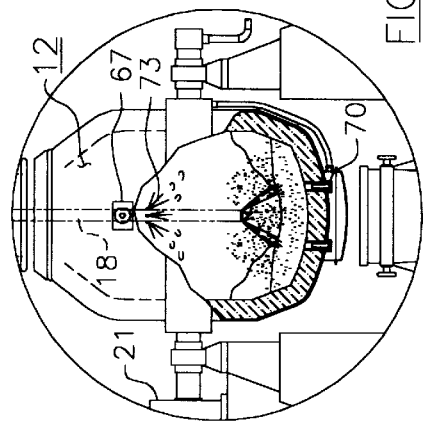
FIG. 3 shows an enlargement of the other furnace shown in FIG. 1.
Figure 2:
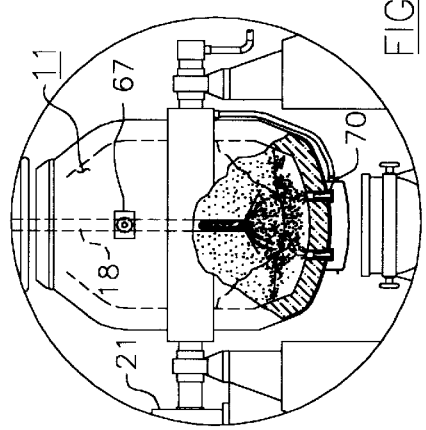
FIG. 2 shows an enlarged view of one of the furnaces shown in FIG. 1.
Figure 2A:
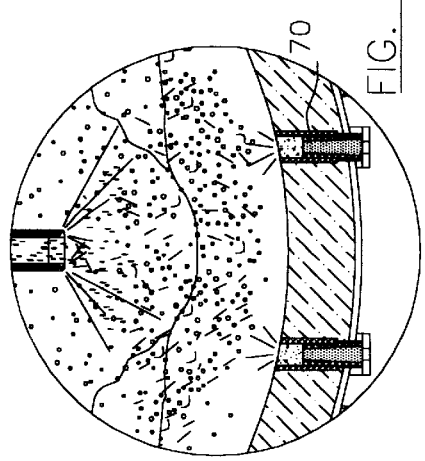
FIG. 2A is an enlargement of the bottom of the furnace shown in FIG. 2.

Referring to FIG. 7, it denotes a configuration wherein annulus 37 is obviated, and the pressure shell is denoted by numeral 47, the heating flue by numeral 49, and the insulation interposed in between by numeral 51; the holes through which the hot gases flow axially are denoted by numeral 53, Referring to FIGS. 2 and 3, the furnaces are denoted by numerals 11 and 12; these furnaces are pear-shaped, and are in common use to make steel; there are slight variations in design of such furnaces but are generally known as BOF's. Hood 22 which is provided to collect the off-gas from the furnaces while blowing, may have a skirt as denoted by numeral 54 in FIG. 8 which is adapted to be dropped over the mouth of the furnace when blowing to limit the aspiration of air into hood 22 and thus prevent the off-gas from combusting. This off-gas may join the process gas downstream of pressure control 45 for treatment. Both the process gas and the off-gas after cleanup may be used as fuel for burners 38 and 39 shown in FIG. 5. Skirt 54 is raised to the dotted position when the furnace is being serviced and not being blown.

Referring to FIG. 9 for the detailed description of lance 18, which is shown in the raised position, 17 is the piping system to deliver the iron/carbon product from any one of reactors 13 to lance 18 which in turn, and in a programmed succession, inject such product into either furnace 11 or furnace 12 depending upon which furnace is oxymelting. Preferably the product is injected hot, with minimum heat loss and while using oxygen of minimum purity since the conditions are reducing and the pick-up of nitrogen into the melt is of no effect. Piping 17 is provided with insulation having a low abrade refractory lining as denoted by numeral 55 to minimize heat loss and abrasion. Lance 18 is made in two parts:- one part is fixed and the other is movable, with the fixed part denoted by numeral 56 being flange mounted to piping 17 at connection 57; the movable part which is denoted by numeral 58, is the part that is raised or lowered by hoist 23 while being guided by the outer jacket of fixed part 56; gland arrangement 59 insures a sliding fit. To prevent fixed part 56 from overheating, cooling water is introduced at pipe-fitting 60 for circulation, the water being discharged at pipe-fitting 61. To prevent movable part 58 from overheating cooling water is introduced at pipe-fitting 62, recirculated and discharged at pipe-fitting 63. Oxygen is introduced at pipe-fitting 64 and discharged from nozzles which are disposed in a circle (ring) at the discharge end of lance 18, such as nozzle 65 provided at the tip of movable part 58. The iron/carbon product produced in reactors 13 while still hot exits lance 18 as indicated by arrow 66 within a ring of oxygen gas formed by nozzles 65. Nozzles 65 are mounted in such a pattern as to blow in various directions to effect the most efficient manner for reacting the oxygen with the injected hot, fluxed iron/carbon product making use of hot process gas for propellant as well as fuel in order to very rapidly melt the iron/carbon product in a plasma-like configuration while maintaining the environment reducing with excess carbon in the iron/carbon product.

Operation with Reference to All the Figures

Assuming that the method is already at steady state and at pressure, and furnace 11 is in the oxymelting phase while furnace 12 is in the decarburizing phase and the ore, coal and flux contained in surge hoppers 25, 26 and 27 respectively, have been dried. A diverter valve denoted by numeral 71, directs the hot, iron/carbon product to furnace 11 by virtue of furnace 11 being in the oxymelting phase. When furnace 12 is in the oxymelting phase and furnace 11 is in the decarburizing phase, diverter valve 71 directs the flow of the hot, iron/carbon product to furnace 12. Feeders 28 feed the appropriate proportions of ore, coal and flux into mixing screw 29 where the charge is thoroughly mixed and discharged into hopper 14. Control valve 31 is activated to fill the cavity of charging tube 30 which is located downstream of ram 36. Hydraulic cylinders 35 are programmed in such a way as to have them periodically actuated to move ram 36 forward to initially compress the materials charged. When the materials are fully compressed (at about 60% of the stroke) the entire content within reactor chamber 34 is caused to move towards discharging end 33 in order to discharge a slug of hot iron/coal product from chamber 34 into elbow 41. This slug of hot product is crushed by rollers 46 and gravity fed into transporter 15, with valve 19 being open and valve 20 closed, and the pressure in transporter 15 being the same as the process pressure in reaction chamber 34. A pre-set number of strokes of cylinders 35 fills transporter 15. Assuming the process pressure at discharge end 33 is 1 atmosphere, the pressure within transporter 15 is also 1 atmosphere when valve 19 is kept opened. To transport the contents of transporter 15 to furnace 11, valve 19 and valve 45 are closed. The gas trapped within transporter 15 is a hot, combustible gas and is at pressure. When valve 20 is opened, the pressure of the gas contained within transporter 15 pneumatically blows the contents of hot, iron/carbon product from transporter 15 through piping system 17 and diverter valve 71, and into furnace 11 via lance 18. If the pressure at which the process is operating is inadequate to pneumatically blow the contents of transporter 15, the pressure within transporter 15 is increased by pumping additional gas into transporter 15 to thus provide the necessary pressure to blow the hot, iron/carbon product into furnace 15. Oxygen exiting from the tip of lance 18 reacts efficiently and instantly with the hot propelling gas and with the C, Si, Mn, and S contained in the hot, iron/carbon product to result in the release of intense thermal energy which is large enough to quickly melt the injected flux together with the iron/carbon product to produce a molten slag and a molten iron, and great quantities of CO; the slag being lighter than the molten iron separates and floats on top of the molten iron.

During this oxymelting step of the process the atmosphere within furnace 11 is kept in a reducing condition by the process gas which is used for the injection of the fluxed iron/carbon product and especially by carbon (converted to CO), which is included as surplus coal in the mix prior to the carbotreating step in reactor 13. This insures the abundant availability of hot fuel as well as excess carbon in order to melt the MgO and the CaO (from the dolomite and from the limestone charged) and the reduced iron contained in the iron/carbon product; the molten MgO and the CaO react with the silica which is derived from the ore and coal ash to thus provide a strongly basic slag which prevents the attack of the basic lining of furnace 11 by the slag if the slag were not basic. Keeping the conditions within furnace 11, hot, reducing and adequately supplied with carbon provides the additional mechanism for the desulfurization of the molten iron, the reduction of FeO to increase the much sought for yield, and the reduction of $P_2O_5$, both the FeO and the $P_2O_5$ having been oxidized during the decarburizing of the previous heat and becoming part of the slag as explained hereinafter. The slag is tapped but not the molten iron. At this point this slag is comparable to blast furnace and can be used for raw cement making, road building, fertilizer making, etc. Furnace 11 containing the de-slagged molten iron, after receiving a coolant and fresh fluxing material (MgO and CaO) is decarburized with pure oxygen which converts the iron into steel with the formation of a new slag, which is rich in FeO making it unwise to waste, and high in phosphorus rendering it of little value. Therefore the use of this slag in the oxymelting step together with carbon makes this slag comparable to blast furnace slag.

To further describe in detail the making of steel directly by means of this invention, the following steps take place:

1. Mixing iron ore concentrate, low sulfur steam (non-coking) coal, dolomitic limestone and non-dolomitic limestone, such mixture having been dried with waste heat.
2. Reducing at pressure the iron ore concentrate w with the steam coal (carbotreating) in pressurized reactors 13 (using the dolomitic limestone and non-dolomitic limestone which are calcined within the reactors to a mixture of dolomitic/quick lime), to make a hot (ranging from about 900° C. to 1350° C.), fluxed iron/carbon product containing excess carbon to maintain a reducing atmosphere, and a high ratio of lime which when melted in the slag (step 3) forms a relatively large component of the slag.
3. Injecting pneumatically the fluxed iron/carbon product while hot into furnace 11 through water cooled combination lance 18, using hot process gas (coke oven gas high in CO) for propellant (coke oven gas having been made in Step 2), and melting (oxymelting) the iron/carbon product by blowing (preferably) 95% pure oxygen through lance 18 with a deficiency of oxygen and excess carbon to cause a very hot, plasma-like environment at the discharge end of lance 18 for the immediate meltdown of the iron/carbon product to occur with substantial volumes of cogenerated to maintain a reducing atmosphere which is enhanced by the excess carbon while at the same time efficiently desulfurizing the molten iron formed, de-oxidizing (reducing) the FeO and some of the $P_2O_5$ in the slag, and stirring the bath with nitrogen from the bottom by making use of injection port 70 during the oxymelting to produce:- (i) a fluid highly basic slag low in FeO and $P_2O_5$, and (ii) an exceptionally high yield of superheated, desulfurized carburized molten iron.
4. Tapping the low FeO basic slag (but not the molten iron) through the mouth of the furnace by tilting it when the oxymelting is completed.
5. Charging coolant (ore or scrap) into furnace 11 containing the molten iron.
6. Blowing the molten iron with pure oxygen (decarburizing) to make a heat of steel in an oxidizing atmosphere (with the addition of dolomitic lime and quick lime to form a fresh, highly basic slag for dephosphorization and lining protection) while at the same time stirring the bath from the bottom with argon by making use of injection port 70, and also post combusting some of the CO formed with oxygen from port 73 of lance 18 located above the bath, for higher thermal energy input within furnace 11.
7. Tapping the heat (but not the slag) into a ladle after completion of the blow through tap hole 67 (the tapped heat is subsequently degassed, micro-alloyed and desulfurized with an artificial slag before being cast). The basic slag remaining after the tap is hot and high in FeO and $P_2O_5$, and is in condition to foam as soon as it comes in contact with carbon in Step 9.
8. Splashing the hot basic slag on the walls and bottom of furnace 11 to build a coating on the lining of furnace 11 by blowing nitrogen.
9. Repeating step 3 (injecting pneumatically the fluxed iron/carbon product etc. . . . ) with immediate foaming of the slag taking place by virtue of CO formation from reacting the FeO and the $P_2O_5$ in the slag with the carbon which is a constituent of the injected hot, iron/carbon product.
10. To keep productivity high and continuous, dual furnaces may be used such as furnace 11 and furnace 12. When furnace 11 is in the process of oxymelting the hot, fluxed iron/carbon product in a reducing atmosphere, furnace 12 is in the process of decarburizing molten iron in an oxidizing atmosphere. Furnace 11 and Furnace 12 alternate in such a way that when furnace 11 is decarburizing, furnace 12 is oxymelting.

Variations of the above described procedure are also possible. By way of example only a single furnace may be used for oxymelting followed by the pouring of the slag and then having the metal decarburized without the provision of an alternate furnace. Also, the splashing of the hot basic slag on the walls and bottom of furnace 11 may be skipped at times.

It is preferred to use ore in the form of concentrate and a low rank, high volatile coal with low ash and low sulfur for technical and economic reasons; other ore forms and other carbonaceous materials may also be used. The intention is to have an ore and coal mix which will produce an iron/carbon product that is easily crushed and also be suitable for pneumatic transport while hot, and for injection by means of a lance with minimum heat loss in order to provide a most efficient and low cost process. Also the intention is to have a low FeO slag in order to increase the yield of steel tapped, and also a slag low in $P_2O_5$ in order to make it marketable like conventional blast furnace slag.

Further the operation of the process at pressure makes possible the reduction of iron ore in the mix quite efficient resulting in minimum use of reductant and maximum productive yield. It is also intended to provide an optimum percentage of reductant in the mix to result in an adequate supply of off-gas as CO which after cleanup would aid in satisfying the thermal energy need required to heat the iron ore, coal and flux in reaction chamber 34 so as to reduce the ore to such level to result in efficient oxymelting in either furnace 11 or furnace 12.

Heretofore, the operation has been guided towards the use of a BOF furnace, such as furnaces 11 and 12; however, an electric arc furnace can be modified to accommodate the present invention, generally as shown in FIG. 4, numeral 72, wherein the electrodes currently used are replaced by lance 18; operationally, the steps mentioned above are generally followed.

From the foregoing detailed description of the disclosure, it is evident that the instant invention is an improvement over the conventional method of making steel from ore, or over the conventional method of melting scrap in an electric arc furnace. It is submitted that the present invention provides a new and useful method for the direct making of steel in a closed system—a much sought for objective, with significant benefits contributed to productivity, energy efficiency, environment and economics. It is also evident that this invention can be used to make iron directly and not steel by obviating the step of decarburizing the iron produced.

What is claimed is:

1. A method for making molten metal comprising:
   mixing a metallic bearing material with a carbonaceous material to form a mixture;
   force feeding the mixture into one end of a reaction chamber by a compacting action applied to said mixture at said end;
   carbotreating the mixture by heating the mixture in said reaction chamber under pressure in a reducing atmosphere to make a metal/carbon product while generating pressurized reducing gases from the carbonaceous material contained in the mixture, wherein the heating is provided by hot gas;
   discharging the metal/carbon product from a discharge end of the reaction chamber, wherein said discharging results from said compacting action;
   transporting the metal/carbon product into a melting furnace;
   oxymelting the metal/carbon product by using the carbon in the metal/carbon product to supply at least a portion of the thermal energy required to melt the metal in said product by reaction with an oxidant within the melting furnace, resulting in a molten metal and a slag;
   separating the molten metal from the slag; and
   collecting the gases generated and cleaning them.

2. The method as set forth in claim 1, wherein the metallic bearing material is an iron bearing material which is converted to an iron/carbon product and melted to molten iron.

3. The method as set forth in claim 2, wherein the molten iron is then converted to steel.

4. She method as set forth in claim 3, wherein the molten iron is produced in one melting furnace and the conversion to steel is carried out in a second furnace.

5. The method as set forth in claim 1, wherein the oxymelting of the metal/carbon product includes melting the metal in said product to make the molten metal under conditions that are reducing.

6. The method as set forth in claim 5, further comprising refining the molten metal under oxidizing conditions.

7. The method as set forth in claim 6, wherein essentially pure oxygen is used in refining the molten metal.

8. The method as set forth in claim 7, wherein the oxidant used during oxymelting is oxygen which is relatively less pure than the oxygen used in refining the molten metal.

9. The method as set forth in claim 1, wherein the carbonaceous material is coal.

10. The method as set forth in claim 1, wherein the method is carried out in such a way as to prevent polluting emissions from being discharged into the atmosphere.

11. The method as set forth in claim 1, wherein during the carbotreating of the mixture, hot gases supply thermal energy for heating the mixture.

12. The method as set forth in claim 1, wherein subsequent to its discharging from the reaction chamber, the metal/carbon product is crushed to condition the product for transport.

13. The method as set forth in claim 1, wherein the metal/carbon product is transported into the melting furnace using pressurized gases to pneumatically convey the product.

14. The method as set forth in claim 13, further comprising injecting the metal/carbon product into the melting furnace by means of a cooled lance.

15. The method as set forth in claim 14, wherein said lance is employed to inject the metal/carbon product while maintaining reducing conditions within said furnace during the melting of the metal contained in the metal/carbon product.

16. The method as set forth in claim 14, wherein the cooled lance injects the metal/carbon product combined with an oxidant into the melting furnace.

17. The method as set forth in claim 1, wherein said reaction chamber includes an annular portion in which said mixture is bi-directionally heated.

18. The method as set forth in claim 1, wherein said reaction chamber includes a tapered portion which diverges towards the discharge end of said reaction chamber in order to facilitate the movement of the mixture through said reaction chamber.

19. The method as set forth in claim 1, Wherein said method is carried out within pressure shells in order to contain the materials processed and the gases produced under pressure.

20. The method as set forth in claim 1, wherein the oxidation of elements in addition to carbon contained in said metal/carbon product supplies at least a portion of the thermal energy required to melt the metal in said product.

21. The method as set forth in claim 1, wherein the pressurized reducing gases generated during carbotreating are directed towards the discharge end of said reaction chamber.

22. The method as set forth in claim 1, wherein the metallic bearing material is an iron bearing material and the iron bearing material is converted to an iron/carbon product, and wherein the oxymelting of the iron/carbon product consumes an adequate amount of said carbon with said oxidant in order to convert said iron/carbon product directly into steel.

23. The method as set forth in claim 3, wherein the molten iron is converted to steel by decarburizing the molten iron by blowing the carburized molten iron, to which a flux material has been aided, in said furnace with oxygen and with the atmosphere within said furnace being maintained in an oxidizing condition in order to generate CO, form a basic slag, and convert the molten iron into steel.

24. The method as set forth in claim 23, wherein during said oxymelting and said decarburizing, a gas is injected through the bottom of said furnace to cause stirring.

25. The method as defined in claim 23, wherein first and second furnaces are employed in such a manner that when said first furnace is oxymelting the iron/carbon product, the second furnace is decarburizing the molten iron, and while the first furnace is decarburizing the molten iron, the second furnace is oxymelting the iron/carbon product.

26. The method as set forth in claim 2, wherein a fluxing material is mixed with said iron bearing material and said carbonaceous material to form said mixture.

27. The method as set forth in claim 26, wherein said fluxing material includes dolomitic lime, quick lime or limestone, or mixtures thereof, to form a slag when molten.

28. The method as set forth in claim 2, wherein said iron/carbon product is discharged from said reaction chamber into a lockhopper in order to prevent emissions into the atmosphere.

29. The method as set forth in claim 2, wherein during oxymelting the carbon in said iron/carbon product is used to supply an atmosphere rich in CO to maintain reducing conditions within said furnace.

* * * * *